(No Model.)

D. W. CURTIS
CHURN.

No. 321,486. Patented July 7, 1885.

WITNESSES.
Jas. F. DuHamel.
Walter S. Dodge

INVENTOR
David W. Curtis.
by Dodge & Son
Attys

United States Patent Office.

DAVID W. CURTIS, OF FORT ATKINSON, WIS., ASSIGNOR OF TWO-THIRDS TO OSCAR S. CORNISH AND WALTER S. GREENE, BOTH OF SAME PLACE.

CHURN.

SPECIFICATION forming part of Letters Patent No. 321,436, dated July 7, 1885.

Application filed March 13, 1884. (No model.)

*To all whom it may concern:*

Be it known that I, DAVID W. CURTIS, of Fort Atkinson, in the county of Jefferson and State of Wisconsin, have invented certain Improvements in Churns, of which the following is a specification.

My invention relates to churns; and it consists in certain features hereinafter more fully pointed out.

Figure 1:
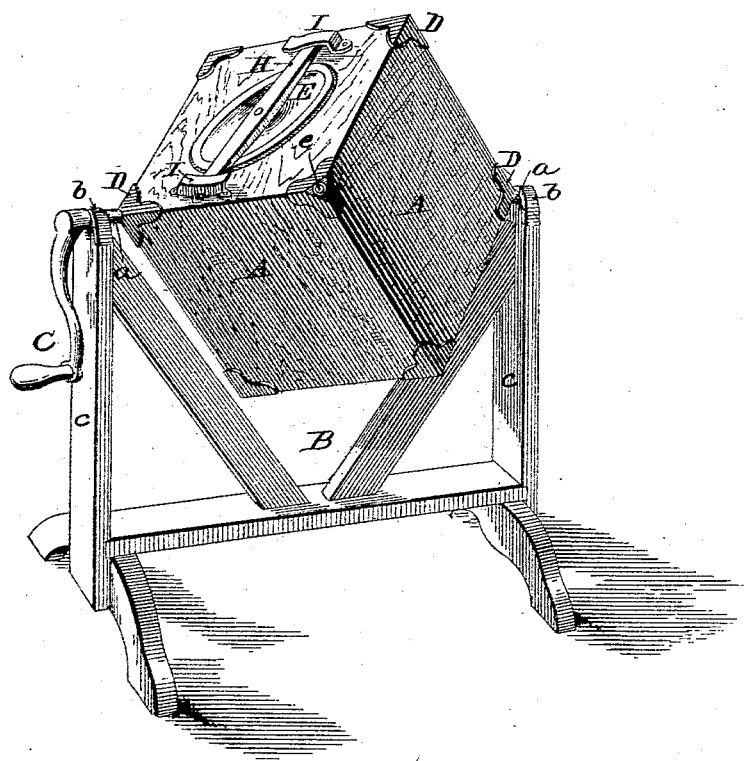
Figure 2:
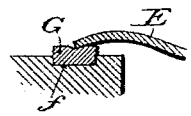
Figure 2:
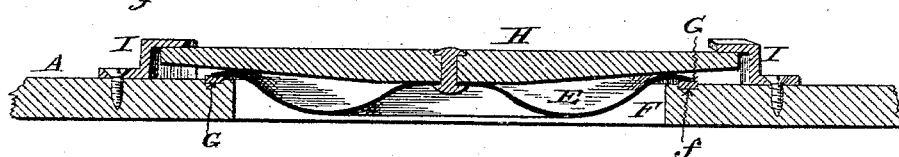
Figure 3:
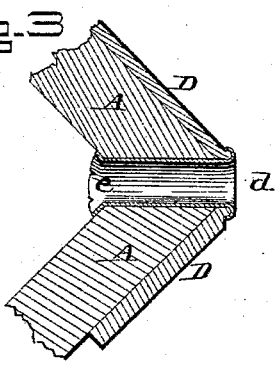

Figure 1 is a perspective view of a churn embodying my improvements; Fig. 2, a sectional view through the cover and the side of the churn to which it is applied; Fig. 3, a sectional view of the outlet-tube at the corner of the churn.

The churn is of that class commonly known as "box-churns," in which a rectangular box is provided with trunnions at two corners diagonally opposite each other, or different sides of the box. Such churns have a removable cover applied to one face or side, and are usually furnished with a hole or outlet near one corner to permit the buttermilk to be drawn off, or to permit the escape of the water used in cleaning the churn.

Referring now to the drawings, A indicates the body or box of the churn, provided at two diagonally-opposite corners with journals $a\,a$, which rotate in boxes or bearings $b\,b$ of uprights $c$ of a frame or support, B, one of which journals is furnished with a crank or band wheel, C, through which motion is imparted to the churn, as usual. The sides of the box are tongued and grooved to make a good joint, and the joint is rendered water-tight by the application of white lead or in any equivalent manner.

D indicates a metallic corner-piece, of which one is applied to each corner, two of these pieces having journals $a\,a$ formed upon them, as shown. One of the corner-pieces D, which are made usually of cast-iron, either malleable or not, but preferably malleable, is formed with an opening, $d$, at the junction of its sides, which opening registers with a hole or opening made at the corner of the box or body A. Passing through the hole or opening in the churn box or body is a tube, $e$, of tin or other suitable metal, slightly longer than the hole through which it is passed, and its ends are turned down upon the inside of the churn and outside of the corner-piece D, as shown in Fig. 3, the tube being swaged within the opening, so as to completely fill it and prevent the milk or cream from finding its way into the sides of the surrounding hole or opening. This feature is an important one, because the hole is necessarily made across the grain of the wood and exposes the end of the grain, so that unless prevented by the tube the milk or cream soaks into the wood and becomes sour, it being impossible to completely remove it; hence it is extremely difficult to keep the churn sweet and clean where the hole is bored through the wood and not lined or bushed, as herein shown and described. When thus bushed, the rotting away of the walls of the hole is prevented, though liable to occur where not so protected. This plan also insures the perfect emptying of the churn—a result which it is difficult to attain when the hole is made, as is customary, through one of the sides close to but not actually in the corner. The point formed by the meeting of the three sides of the corner-piece is cut away, as shown in Figs. 1 and 3, to form a plane face at right angles to the length of tube $e$ for the end of said tube to be turned over upon. The tube or outlet is closed by a cork, as usual, the smooth interior of the tube greatly facilitating the entrance and removal of the cork, and insuring a perfect stoppage of the outlet.

E is the cover, which is applied over an opening, F, made in the side of the churn, and is preferably of circular form. It is made of tin, or of sheet-iron tinned on its faces, and of such thickness as to possess considerable strength and elasticity. The extreme outer edge is slightly turned downward to insure its touching the surface within which it is pressed into contact when in place upon the churn-box.

G indicates a cork packing or filling seated in a groove or recess, $f$, surrounding the opening F and set a little back from the sides or walls thereof, as shown in Fig. 2. The groove is ordinarily made about a quarter of an inch in depth and from a quarter to a half an inch in width, the cork filling being placed therein and brought flush with or a little above the surface of the side of the churn to which it is applied, so that the edge of the cover may rest upon it with certainty. The cover is either pressed or spun into shape, and has a raised central portion, which joins the outer edge or rim by a compound curve, giving to the cover a considerable degree of elasticity.

H indicates a cross-bar pivoted at its middle to the center of the cover E, its ends projecting beyond the cover at each side, and serving to lock the cover in place by passing beneath inclined clips or keepers I, secured to the body of the churn, the cover being applied to the box with its rim or edge resting upon the cork filling G, and is pressed and held in place by swinging the edges of the cross-bar under the clips or keepers I, and forcing said ends thereunder until the required pressure is secured. The edge of the cover is thus embedded in the packing, and a perfectly close joint is thereby insured. Other yielding or elastic material may be substituted for the cork packing, but not to so good advantage, the cork being cheap, admirably adapted to the purpose, and free from taste or odor which might affect the milk or cream.

No claim is made, broadly, to the cross-bar and inclined clips or keepers, as these are known to be old.

I am aware that an angular churn-body has been provided with journals at diagonally-opposite corners, and that it has been proposed to make one of such journals hollow or of tubular form for the purpose of ventilation. Such construction, however, affords no outlet for the milk or other liquid contents of the churn, because always and necessarily above the level thereof.

Having thus described my invention, what I claim is—

In combination with a churn box or body, A, and a metallic corner-piece applied thereto, an outlet-tube passing through the corner of the churn and corner-piece and spread at its ends, to prevent the contents of the churn from entering the pores of the wood or the space between the body and corner-piece, substantially as and for the purpose set forth.

DAVID W. CURTIS.

Witnesses:
L. GOSSELIN,
D. L. DAMUTH.